(12) United States Patent
Gum

(10) Patent No.: US 9,317,046 B2
(45) Date of Patent: Apr. 19, 2016

(54) VARIABLE OUTPUT HEATING CONTROL SYSTEM

(76) Inventor: Mike Gum, Sylacauga, AL (US)

( * ) Notice: Subject to any disclaimer, the term of this patent is extended or adjusted under 35 U.S.C. 154(b) by 1732 days.

(21) Appl. No.: 12/167,723

(22) Filed: Jul. 3, 2008

(65) Prior Publication Data

US 2010/0001087 A1   Jan. 7, 2010

(51) Int. Cl.
| | |
|---|---|
| F24D 10/00 | (2006.01) |
| F24D 19/00 | (2006.01) |
| G05D 23/00 | (2006.01) |
| G05D 7/00 | (2006.01) |
| G05D 23/19 | (2006.01) |
| F23N 1/00 | (2006.01) |
| F23N 5/02 | (2006.01) |
| F24D 12/02 | (2006.01) |
| F24D 19/10 | (2006.01) |
| F24H 1/46 | (2006.01) |
| F24H 9/20 | (2006.01) |

(52) U.S. Cl.
CPC ............... *G05D 23/19* (2013.01); *F23N 1/005* (2013.01); *F23N 5/025* (2013.01); *F24D 12/02* (2013.01); *F24D 19/1006* (2013.01); *F24H 1/46* (2013.01); *F24H 9/2035* (2013.01); *F23N 2025/08* (2013.01); *F23N 2037/02* (2013.01); *F24D 2200/043* (2013.01); *Y02B 30/14* (2013.01)

(58) Field of Classification Search
USPC .............. 237/2 A, 81, 12, 53, 7; 110/186; 137/905, 1; 251/120; 700/282, 300
See application file for complete search history.

(56) References Cited

U.S. PATENT DOCUMENTS

| | | | | | |
|---|---|---|---|---|---|
| 2,139,344 | A | * | 12/1938 | Andersen ....................... | 236/1 E |
| 2,313,340 | A | * | 3/1943 | Harris .......................... | 236/21 R |
| 2,369,993 | A | * | 2/1945 | Turner .......................... | 126/101 |
| 3,123,298 | A | * | 3/1964 | Wolffe ......................... | 236/46 R |
| 3,196,900 | A | * | 7/1965 | Catheron et al. ............ | 137/487.5 |
| 3,402,739 | A | * | 9/1968 | Kass ............................. | 137/628 |
| 3,443,576 | A | * | 5/1969 | Kervin ........................... | 137/88 |

(Continued)

FOREIGN PATENT DOCUMENTS

| | | | | |
|---|---|---|---|---|
| GB | 1597220 | A | * | 9/1981 |
| JP | 56044531 | A | * | 4/1981 |

(Continued)

OTHER PUBLICATIONS

Adams, Modulation Migration, Nov. 2007, Applicance Design, pp. 42-47.*

*Primary Examiner* — Alissa Tompkins
*Assistant Examiner* — Phillip E Decker

(57) ABSTRACT

A variable output heating control system includes a user interface, an operating parameter sensor, a controller, a combination control valve, a plurality of variable flow valves, and a plurality of burners. The user interface allows a user to enter operating parameters, such as a set temperature. The operating parameters sensor provides measured parameters, such as a measured temperature. The controller receives the set temperature and the measured temperature and generates commands to control the flow of gas, based on the set temperature and the measured temperature. The combination control valve shuts off the flow of gas from an external gas source based on a command from the controller. The plurality of variable flow valves vary the flow of gas that is received from the combination control valve and supplied to the burners. The plurality of burners provide heat based on the combustion of gas that is received from the plurality of variable flow valves.

15 Claims, 8 Drawing Sheets

(56) References Cited

U.S. PATENT DOCUMENTS

| | | | | |
|---|---|---|---|---|
| 3,763,744 A | * | 10/1973 | Fournell et al. | 91/20 |
| 3,779,459 A | * | 12/1973 | Battersby et al. | 236/15 A |
| 3,997,107 A | * | 12/1976 | Block et al. | 236/1 A |
| 4,147,144 A | * | 4/1979 | Furucz | 123/545 |
| 4,191,215 A | * | 3/1980 | Gonner | 137/870 |
| 4,204,830 A | * | 5/1980 | Jones et al. | 431/8 |
| 4,337,893 A | * | 7/1982 | Flanders et al. | 237/7 |
| 4,354,633 A | * | 10/1982 | Turner et al. | 236/1 H |
| 4,798,531 A | * | 1/1989 | Breckner | 431/12 |
| 4,922,861 A | * | 5/1990 | Tsutsui et al. | 122/448.1 |
| 5,234,196 A | * | 8/1993 | Harris | 251/328 |
| 5,249,773 A | * | 10/1993 | Feld | 251/129.11 |
| 5,458,294 A | * | 10/1995 | Zachary et al. | 239/585.5 |
| 5,678,521 A | * | 10/1997 | Thompson | F02M 63/00 123/446 |
| 5,849,250 A | * | 12/1998 | Timko | 422/177 |
| 5,937,846 A | * | 8/1999 | Martin et al. | 126/39 E |
| 6,000,933 A | | 12/1999 | Frederick, Sr. | |
| 6,032,919 A | * | 3/2000 | Giacomino et al. | 251/30.02 |
| 6,109,591 A | * | 8/2000 | Tuttle et al. | 251/208 |
| 6,234,196 B1 | | 5/2001 | Fischer et al. | 137/493.8 |
| 6,247,919 B1 | * | 6/2001 | Welz et al. | 431/13 |
| 6,265,699 B1 | * | 7/2001 | Scott | 219/483 |
| 6,866,202 B2 | * | 3/2005 | Sigafus et al. | 236/11 |
| 6,882,924 B2 | * | 4/2005 | Miller | 701/100 |
| 6,968,853 B2 | * | 11/2005 | Amazorrain | 137/66 |
| 7,100,597 B2 | * | 9/2006 | Rand | 126/110 R |
| 7,241,135 B2 | * | 7/2007 | Munsterhuis et al. | 431/12 |
| 7,255,100 B2 | * | 8/2007 | Repper et al. | 126/39 BA |
| 7,287,551 B2 | * | 10/2007 | James | 137/629 |
| 7,293,718 B2 | * | 11/2007 | Sigafus et al. | 236/11 |
| 7,467,639 B2 | * | 12/2008 | Watson et al. | 137/1 |
| 8,028,968 B2 | * | 10/2011 | Gum | 251/122 |
| 8,844,568 B2 | * | 9/2014 | Pan | F16K 11/072 137/554 |
| 2005/0058960 A1 | * | 3/2005 | Santos | 431/79 |
| 2005/0250062 A1 | * | 11/2005 | Kornbluth et al. | 431/79 |
| 2007/0240775 A1 | * | 10/2007 | Crnkovich et al. | 137/625.65 |
| 2008/0035746 A1 | * | 2/2008 | Willms | 237/2 A |
| 2008/0293000 A1 | * | 11/2008 | Gum | 431/12 |
| 2009/0044027 A1 | * | 2/2009 | Piazza | 713/300 |
| 2009/0061373 A1 | * | 3/2009 | Bannos et al. | 431/347 |
| 2010/0009303 A1 | * | 1/2010 | Santinanavat et al. | 431/12 |

FOREIGN PATENT DOCUMENTS

| | | | |
|---|---|---|---|
| JP | 60149818 A | * | 8/1985 |
| JP | 2004353990 A | * | 12/2004 |

* cited by examiner

VARIABLE OUTPUT HEATING CONTROL SYSTEM

BACKGROUND OF THE INVENTION

1. Field of the Invention

Embodiments of the present invention relate to systems and methods for controlling combustible fuel heating systems. More particularly, embodiments of the present invention relate to systems and methods for controlling gas flow to individual or multiple burners in a combustible fuel heating system.

2. Description of the Related Art

Residential and commercial gas furnace systems typically employ multiple burners to provide sufficient heating capacity. Generally, a combination control valve controls the supply of fuel from a fuel source to the burners in an on/off fashion, such that all the burners are either fully on or fully off. The furnace cannot turn on individual burners nor can it vary the flow of gas to the burners. This type of on/off control system often incurs temperature overshoot, wherein the output temperature (or the ambient temperature of the house or building) rises above the temperature setting as a result of all burners turning on at maximum capacity in an attempt to raise the temperature by a small amount. Thus, fine resolution control of the output temperature is difficult. Alternatively, if the control system is adjusted to reduce temperature overshoot, then there is often a large steady-state error of the output temperature as compared with the set temperature, typically on the cold side, as the control system waits until the output temperature drops low enough below the set temperature to turn on all the burners at maximum capacity. Therefore, the on/off heating control system is inefficient by using excessive energy to maintain the set temperature or is ineffective by leaving the burners off for too long resulting in a cold and uncomfortable environment.

SUMMARY OF THE INVENTION

Embodiments of the present invention solve the above-mentioned problems and provide a distinct advance in the art of controlling the flow of gas in a gas furnace. More particularly, embodiments of the invention provide a system and method for varying or shutting off the flow of gas to individual burners in a multiple-burner combustible fuel heating system.

In various embodiments, the system may comprise a user interface, an operating parameter sensor, a controller, a plurality of burners, a combination control valve, and a plurality of variable flow valves. The user interface may allow a user to enter data, such as a set temperature, into the controller, and to read out information from the controller about the status of the system, among other things. The operating parameter sensor may measure the ambient temperature of the space to be heated or the temperature of a particular portion of the system. The controller may receive the set temperature from the user interface and the measured temperature from the operating parameter sensor. Based upon the set temperature and the measured temperature, the controller may generate a plurality of commands to vary the flow of gas in the system. The combination control valve may control the flow of gas from an outside gas source to the plurality of variable flow valves. Generally, the combination control valve is open to allow gas flow or is closed to prevent gas flow, based upon a command from the controller. The variable flow valves vary the amount of gas flowing from the combination control valve that is supplied to the burners. The varying of the gas flow rate is controlled by a command from the controller. The burners provide combustion of the gas from the variable flow valves, which in turn provides heat.

In other embodiments, the system may comprise a user interface, an operating parameter sensor, a controller, a plurality of burners, a modulating combination control valve, and a plurality of shutoff valves. The user interface may allow a user to enter data, such as a set temperature, into the controller, and to read out information from the controller about the status of the system, among other things. The operating parameter sensor may measure the ambient temperature or the temperature of a particular portion of the system. The controller may receive the set temperature from the user interface and the measured temperature from the operating parameter sensor. Based upon the set temperature and the measured temperature, the controller may generate a plurality of commands to vary the flow of gas in the system. The modulating combination control valve may vary the flow of gas from an outside gas source to the plurality of shutoff valves. The amount by which the flow of gas varies is controlled by a command from the controller The shutoff valves control the amount of gas flowing from the modulating combination control valve that is supplied to the burners. Generally, the shutoff valve is open to allow gas flow or is closed to prevent gas flow. The burners provide combustion of the gas from the shutoff valves, which in turn provides heat.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention is described in detail below with reference to the attached drawing figures, wherein.

Figure 1:
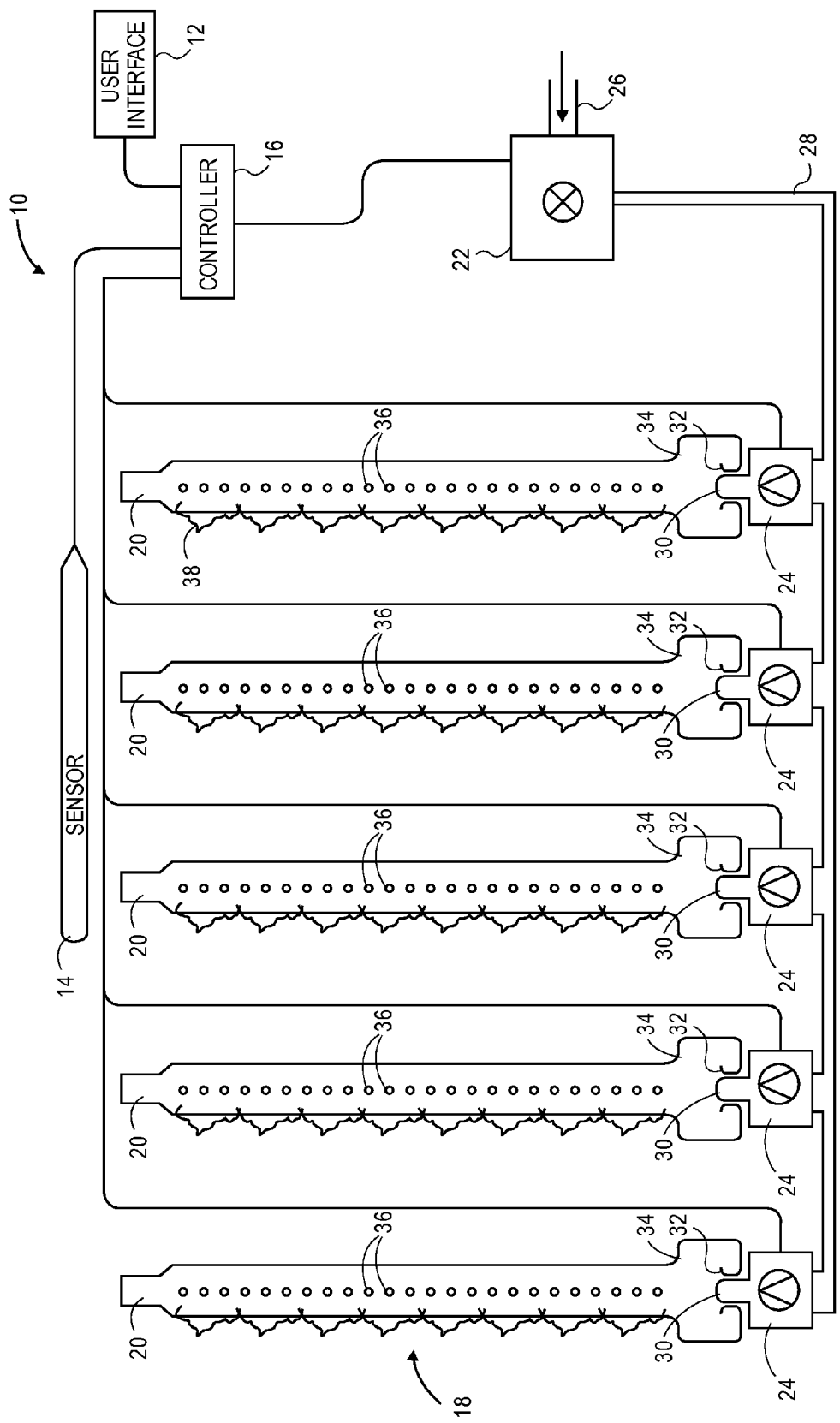
FIG. 1 is a schematic diagram of a variable output heating control system constructed in accordance with a first embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A variable output heating control system 10 constructed in accordance with an exemplary embodiment of the present invention is shown in FIG. 1. The system 10 may comprise a user interface 12, an operating parameter sensor 14, a controller 16, a heat generating unit 18 that includes a plurality of burners 20, a combination control valve 22, and a plurality of variable flow valves 24.

The user interface 12 generally allows a user to interact with the system 10, whereby the user may input parameters, commands, and/or data as well as obtain information from the system 10, and in particular, the controller 16. The user may utilize the user interface 12 to input data such as a desired temperature setting or a range of temperature settings. The user may also use the user interface 12 to program a sequence of temperatures based on time of day, day of week, or other criteria. For example, the user may program a certain temperature or temperatures for the daytime hours and a different set of temperatures for the nighttime hours. The user may also program a particular sequence of temperatures for the week days and a different sequence for the weekends. The user may enter other parameters as well, such as a gas pressure or a gas flow rate. In addition, the user may enter commands via the user interface 12. The user may power the system 10 on or off or may control auxiliary devices, such as a fan or blower. Furthermore, the user may utilize the user interface 12 to view data or commands as they are being entered, as well as review the status or settings of the system 10 and programmed temperature sequences.

The user interface 12 may include data entry devices such as touchscreens, keyboards, keypads, mice or other pointing devices, pushbuttons, switches, rotary knobs, and the like. The user interface 12 may also include data readout devices such as monitors (e.g., cathode ray tube (CRT), plasma, liquid crystal display (LCD)), dot-matrix displays, seven-segment LED displays, one or more individual LEDs or lights, and the like. The user interface 12 may include other electrical or electronic components formed from analog and digital circuitry, such as analog-to-digital converters (ADCs) or digital-to-analog converters (DACs), and the like.

The data entry and data readout portions of the user interface 12 may be integrated in a single unit or may be housed in separate units. The user interface 12 may be located in close proximity to the rest of the system 10 and in some embodiments, the user interface 12 may be integrated with the controller 16. In other embodiments, the user interface 12 may be remote from the controller 16 and the heat generating unit 18, such as in another room or another building. The user interface 12 may communicate with the controller 16 either via wires or wirelessly. The wires may include commonly-known metallic conductors such as individual wires or multi-conductor cables, optical fibers, or other physical communication media. Wireless communication may include radio frequency (RF) transmission that utilizes standard analog or digital protocols, such as Institute of Electrical and Electronics Engineers (IEEE) wireless standards 802.11, 802.15 (which includes Bluetooth™), 802.16, and the like. Wireless communication may also include optical line of sight transmission, or similar wireless communication methods.

The operating parameter sensor 14 generally senses or measures a plurality of operating parameters and reports them to the controller 16. The controller 16 may adjust the settings of the combination control valve 22 and the variable flow valves 24 based on data from the operating parameter sensor 14. Parameters that the operating parameter sensor is capable of measuring may include thermal energy, or ambient temperature, gas pressure, or gas flow rate. Typically, the operating parameter sensor 14 is located in a room or area of primary importance, perhaps where people spend most of their time. Often, the operating parameter sensor 14 is located in a central portion of the home or building, which may also be the location of the controller 16 and in some embodiments, the operating parameter sensor 14 may be integrated with the controller 16. The system 10 may also include more than one operating parameter sensor 14 to sense parameters in various locations, such as different rooms or different levels of a house or building. The controller 16 may average the readings from the different operating parameter sensors or may apply a different criteria or algorithm when determining how to set the valves based on temperature, pressure, or flow readings. In various embodiments, there may also be one or more operating parameter sensors 14 positioned near the burners 20 and in or around the combination control valve 22 and the variable flow valves 24 to detect the performance of the heat generating unit 18. These sensors 14 may monitor the temperature, pressure, or flow rate among components such as a heat exchanger, duct inlets, and duct outlets.

The operating parameter sensor 14 may include devices to measure thermal energy, such as thermometers, infrared sensors, thermal transducers, gas pressure sensors or transducers, gas flow meters, and the like. The operating parameter sensor 14 may also include other electrical or electronic components formed from analog and digital circuitry, such as ADCs or DACs, and the like.

As with the user interface 12, the operating parameter sensor 14 may communicate with the controller 16 either via wires or wirelessly. The wires may include commonly-known metallic conductors such as individual wires or multi-conductor cables, optical fibers, or other physical communication media. Wireless communication may include RF transmission that utilizes standard analog or digital protocols, such as IEEE 802.11, 802.15, 802.16, and the like. Wireless communication may also include optical line of sight transmission, or similar wireless communication methods.

The controller 16 generally receives input from the user interface 12 and the operating parameter sensor 14 and transmits output to the user interface 12, the combination control valve 22, and the variable flow valves 24. The controller 16 may receive input from the user interface 12, such as a desired temperature setting (set temperature), and from the operating parameter sensor 14, such as a measured temperature, both as described above. Based on the set temperature, the measured temperature, and the temperature difference (being the set temperature minus the measured temperature), the controller 16 may send signals to the combination control valve 22 and the variable flow valves 24 to either increase or decrease the flow of gas to the burners 20. Generally, the flow of gas is proportional to the temperature difference. The greater the temperature difference, the greater the flow of gas. The smaller the temperature difference, the smaller the flow of gas.

The system 10 generally matches the architecture of a feedback control system 10 with an input to the system 10 being the set temperature from the user interface 12, the controlled quantity being heat (as produced by combustion of flowing gas), and feedback of the controlled quantity being the measured temperature supplied by the operating parameter sensor 14. As such, the controller 16 may include one or more generally known control structures, such as a proportional-integral-derivative (PID) controller, or variations thereof. The controller 16 may also be designed for optimization, such as minimizing temperature overshoot, response time, settling time, steady-state error, or other criteria.

The controller 16 may be implemented in hardware, software, firmware, or combinations thereof. The controller 16 may include a processing element coupled with a memory element that in combination are able to execute software code segments which implement the control function. The controller 16 may also include microcomputers, microprocessors, microcontrollers, programmable intelligent computers (PICs), field-programmable gate arrays (FPGAs), programmable logic devices (PLDs), programmable logic controllers (PLCs), and the like. The controller 16 may also include a requisite memory component such as hard-disk drives, optical disks, floppy disks, random-access memory (RAM), read-only memory (ROM), cache memory, programmable ROM (PROM), erasable PROM (EPROM), and the like. Furthermore, the controller 16 may include actuating components that are capable of receiving a temperature variable signal, wherein the components may be pneumatic, hydraulic, bimetallic, or the like.

The controller 16 may be located in the proximity of the heat generating unit 18, or may be remote from the heat generating unit 18, and further may be integrated with the user interface 12, the operating parameter sensor 14, or both. Similar to the components described above, the controller 16 may communicate with the combination control valve 22 and the variable flow valves 24 either via wires or wirelessly. The wires may include commonly-known metallic conductors such as individual wires or multi-conductor cables, optical fibers, or other physical communication media. Wireless communication may include RF transmission that utilizes standard analog or digital protocols, such as IEEE 802.11. Wireless communication may also include optical line of sight transmission, or similar wireless communication methods.

The combination control valve 22 generally reduces the pressure of the gas coming from an external supply that is delivered through a gas inlet 26. The reduced pressure gas may be in turn supplied to the variable flow valves 24, which control the flow of gas to the burners 20. The combination control valve 22 may also shut off the supply of gas to the variable flow valves 24. The operation of the combination control valve 22 may be determined by the controller 16, such that the controller 16 may send a signal to the combination control valve 22 to close the valve and shut off the supply of gas to the variable flow valves 24.

The combination control valve 22 may include components for the control of gas flow such as a gas pressure regulator, a pilot valve, an ignition source, a flame sensor, and a safety shutoff valve. The gas pressure regulator may regulate the pressure of the gas delivered to the variable flow valves 24 at a constant value in order to maintain consistency of the heating rate of the system 10.

The combination control valve 22 and the variable flow valve 24 may be generally in close proximity to each other. The combination control valve 22 may be connected to the variable flow valves 24 through a manifold 28. Other connection schemes include piping, tubing, ducting, or the like, in addition to fittings, connectors, and couplers.

Figure 6:
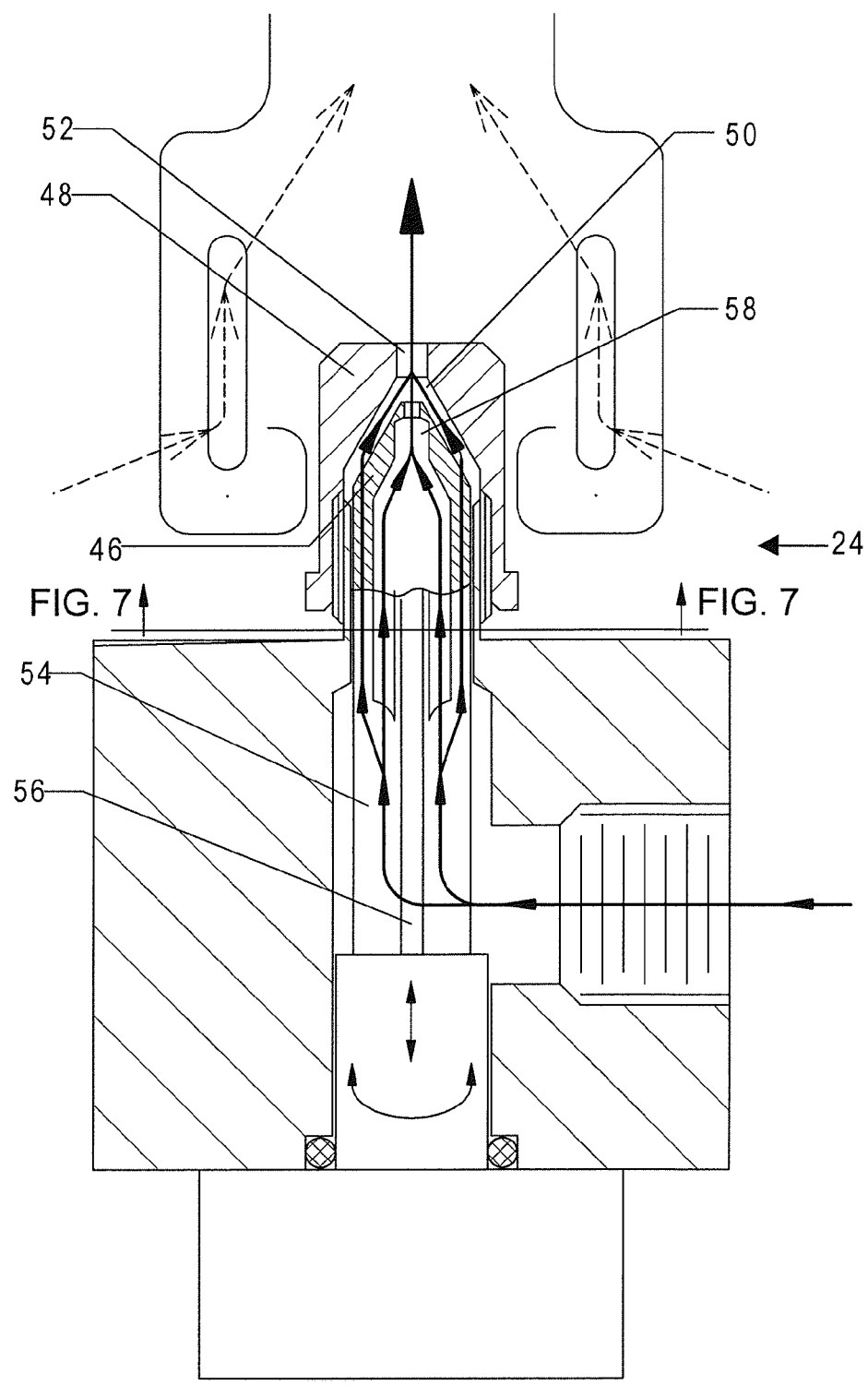
FIG. 6 is a sectional view of a variable flow valve that may be utilized with embodiments of the variable output heating control system.
Figure 7:
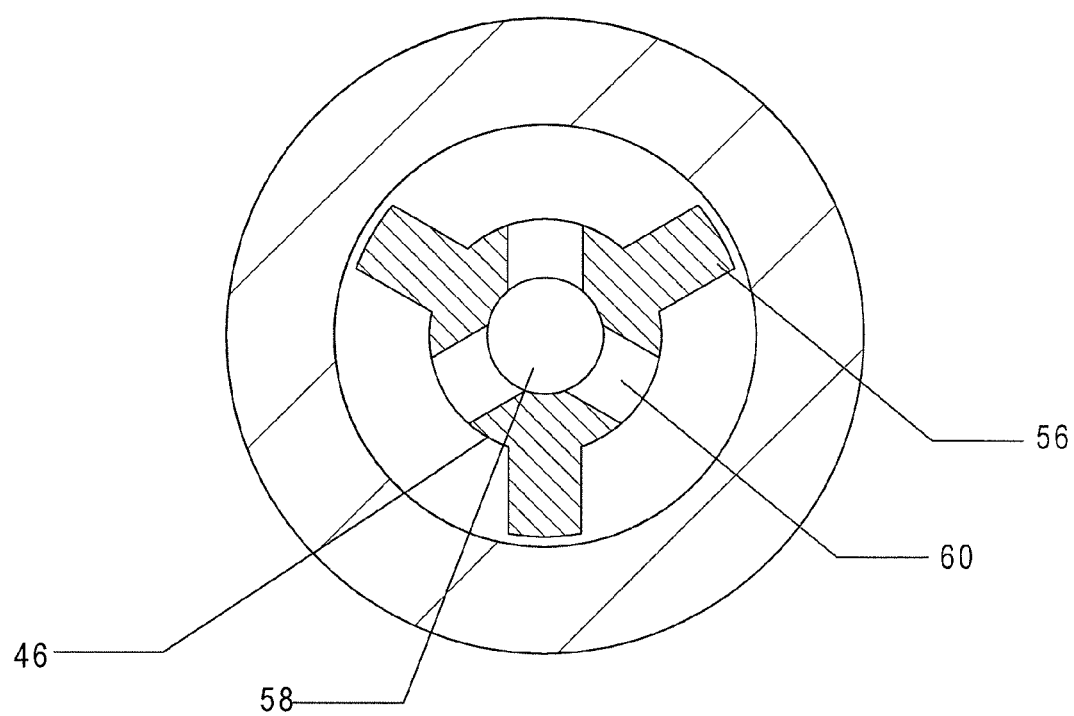
FIG. 7 is a sectional view of a metering pin that may be utilized with the variable flow valve.

The variable flow valve 24 generally modulates the flow of gas to the burner 20 to which it is coupled. An example of the variable flow valve 24 is disclosed in "VARIABLE ORIFICE GAS FLOW MODULATING VALVE", application Ser. No. 11/751,854, filed May 22, 2007, which is hereby incorporated by reference, in its entirety. The variable flow valve 24 is shown in greater detail in FIGS. 6 and 7 and controls the flow of gas by the movement of a metering pin 46 in an orifice hood 48. In various embodiments, the orifice hood 48 may include an internal recess 50 and an outlet orifice 52. The metering pin 46 may include a central portion 54, a plurality of fins 56, a passage 58 for the flow of gas, and an opening between each pair of fins 60. However, other valves that can vary the flow of gas through an output may be used for the variable flow valve.

Generally, the variable flow valve 24 may be able to modulate the flow of gas in incremental steps of 1% or less. Thus, the variable flow valve 24 may allow the rate of gas flowing to the burner 20 to vary from 100% down to 1%. The variable flow rate of the modulating valve may be controlled by a signal from the controller 16. The variable flow valve 24 may receive gas from the combination control valve 22 through the manifold 28 and may supply regulated-flow gas to the burner 20 through an output orifice 30 at one end of the variable flow valve.

The burner 20 may include an inlet port 32, a mixing chamber 34, and a plurality of outlet ports 36. The burner 20 may be somewhat elongated, though other shapes are possible. At one end may be the inlet port 32, through which the burner 20 receives gas from the output orifice 30 of the variable flow valve. There may also be a gap between the output orifice 30 of the variable flow valve 24 and the inlet port 32 through which ambient air flows. The flow of gas into the inlet port 32 generally pulls in ambient air into the mixing chamber 34, where gas and ambient air combine. The amount of air in the mixing chamber 34 may be related to the velocity of the flow of gas from the output orifice 30. The greater the velocity of gas flow, the more air that is in the chamber, wherein a sufficient amount of air is desirable to provide more thorough combustion of the gas. Thorough combustion of the gas generally increases the efficiency of the system 10 and reduces the emission of uncombusted gas into the atmosphere. The output orifice 30 of the variable orifice modulating valve described above generally provides gas flow at a higher velocity, which in turn helps pull in a sufficient amount of air to the mixing chamber 34. The outlet ports 36 may be uniformly distributed along the length of the burner 20 and may provide flames 38 as a result of the combustion of the gas and air mixture. The level of the flames 38 may also be directly related to the amount of heat given off by the burner, such that higher flames 38 may relate to greater heat being produced.

The burner 20 may also include one or more of the following components: atmospheric burners, induced draft burners, power burners, or inshot burners. Power burners and induced draft burners may utilize an electric powered blower to supply primary air to the burner 20 for mixing with the gas flow, to create the desired gas and air ratio for complete combustion. Alternatively, atmospheric type burners rely on the flow velocity of the gas exiting the orifice to create enough draft in the mixing chamber 34 area of the burner 20 to draw in sufficient primary air for complete combustion. Furthermore, the burner 20 may include a turndown ratio, which establishes the lower limit of the gas flow rate that the burner 20 is capable of supporting. For example, a burner 20 with a 4:1 turndown ratio may support a gas flow rate of 25%, or greater, of maximum flow rate. In this example, a gas flow rate of below 25% may result in decreased energy efficiency and increased emissions of uncombusted gas.

Figure 8:
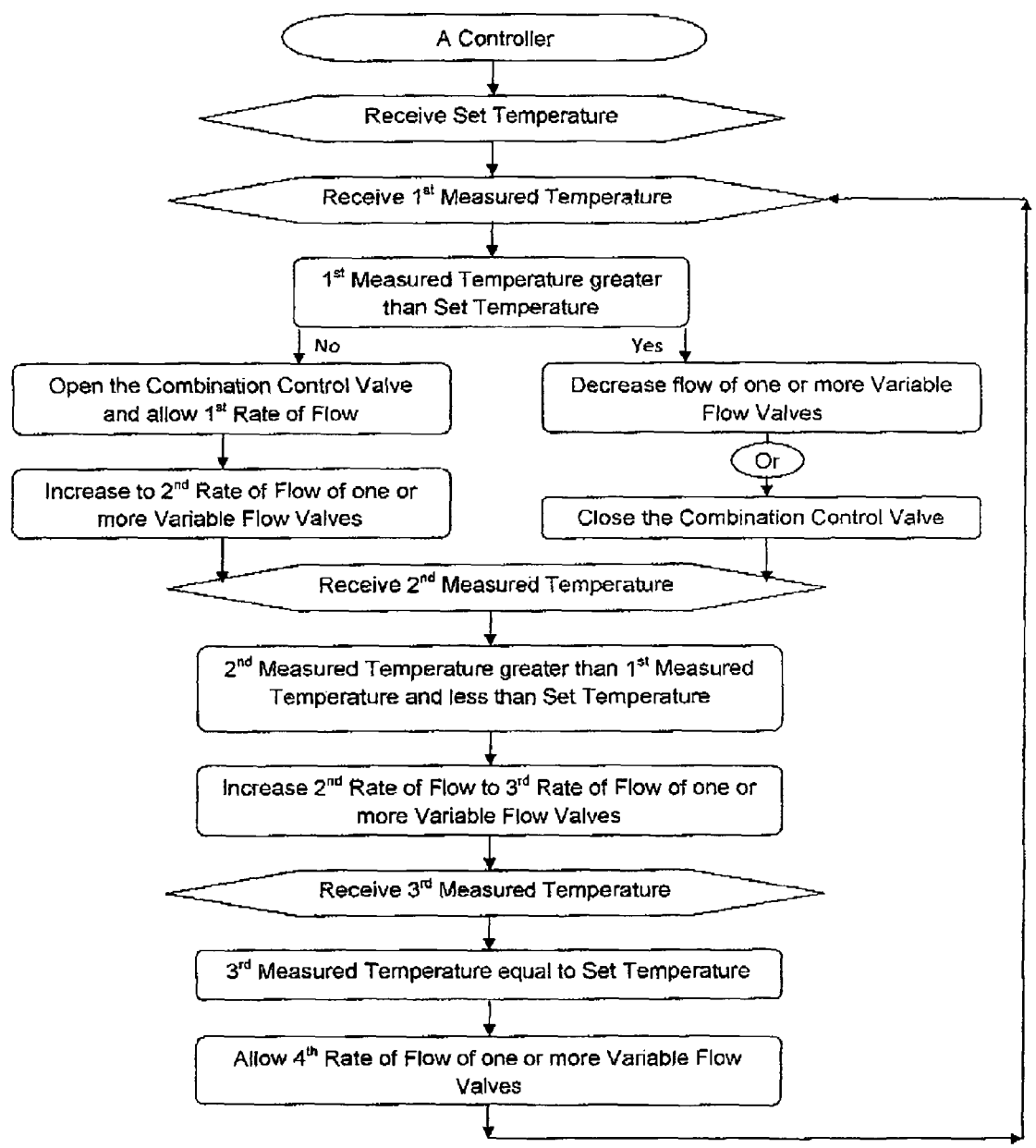
FIG. 8 is a flow diagram showing a method for controlling the heat output of a variable output heating control system.

The variable output heating control system 10 may operate as follows and as is illustrated in the flow chart in FIG. 8. The system 10 may include one or more burners 20 and variable flow valves 24. An exemplary embodiment of the system 10, as seen in FIG. 1, includes five burners 20 receiving gas from five variable flow valves 24. A user enters a temperature, the set temperature, to the controller 16 by using the user interface 12. The user may also enter a "start" or other initiating command to alert the controller 16 that data entry has ceased. The controller 16 compares the set temperature with the measured temperature, supplied by the operating parameter sensor 14. If the measured temperature is above the set temperature, the controller 16 may close the combination control valve 22, thereby shutting off the flow of gas to the variable flow valves 24, and in turn the burners 20. The controller 16 may also send a signal to one or more the variable flow valves 24 to reduce the flow of gas to the burners 20 to its minimum or close to its minimum, thereby reducing the level of the gas flames 38 and the heat produced.

If the measured temperature is below the set temperature, the controller 16 may send a signal to the combination control valve 22 to open and may send a signal to one or more of the variable flow valves 24 to open at least partially to allow some gas to flow to the burners 20, where it may be combusted and produce heat. If the measured temperature is well below the set temperature, the controller 16 may leave the combination control valve 22 open and send a signal to one or more of the variable flow valves 24 to allow 100% gas flow to the burners 20, increasing the level of the flames 38 and the heat produced. As the measured temperature approaches the set temperature, the controller 16 may send a signal to one or more of the variable flow valves 24 to reduce the gas flow rate. For example, the controller 16 may send a signal to all the variable flow valves 24 to reduce the flow of gas to 50%, thereby reducing the heat output by approximately 50%. However, specifically how each variable flow valve 24 is controlled (i.e., the value of each flow rate) may depend on a plurality of factors such as the rate at which the measured temperature is approaching the set temperature as well as the controller architecture type and factors that include optimization, such as reduced temperature overshoot, decreased settling time, etc.

As the measured temperature gets very close to the set temperature, the controller 16 may continue to reduce the flow rate of one or more of the variable flow valves 24. If the measured temperature equals the set temperature, the controller 16 may reduce the flow rate of one or more of the variable flow valves 24 to its minimum or near the minimum. The controller 16 may maintain this setting, or may adjust the setting slightly, as long as the two temperatures are equal. If the measured temperature increases or decreases, the controller 16 may adjust the flow rates of the variable flow valves 24 or open or close the combination control valve 22 accordingly, as described above.

Figure 2:
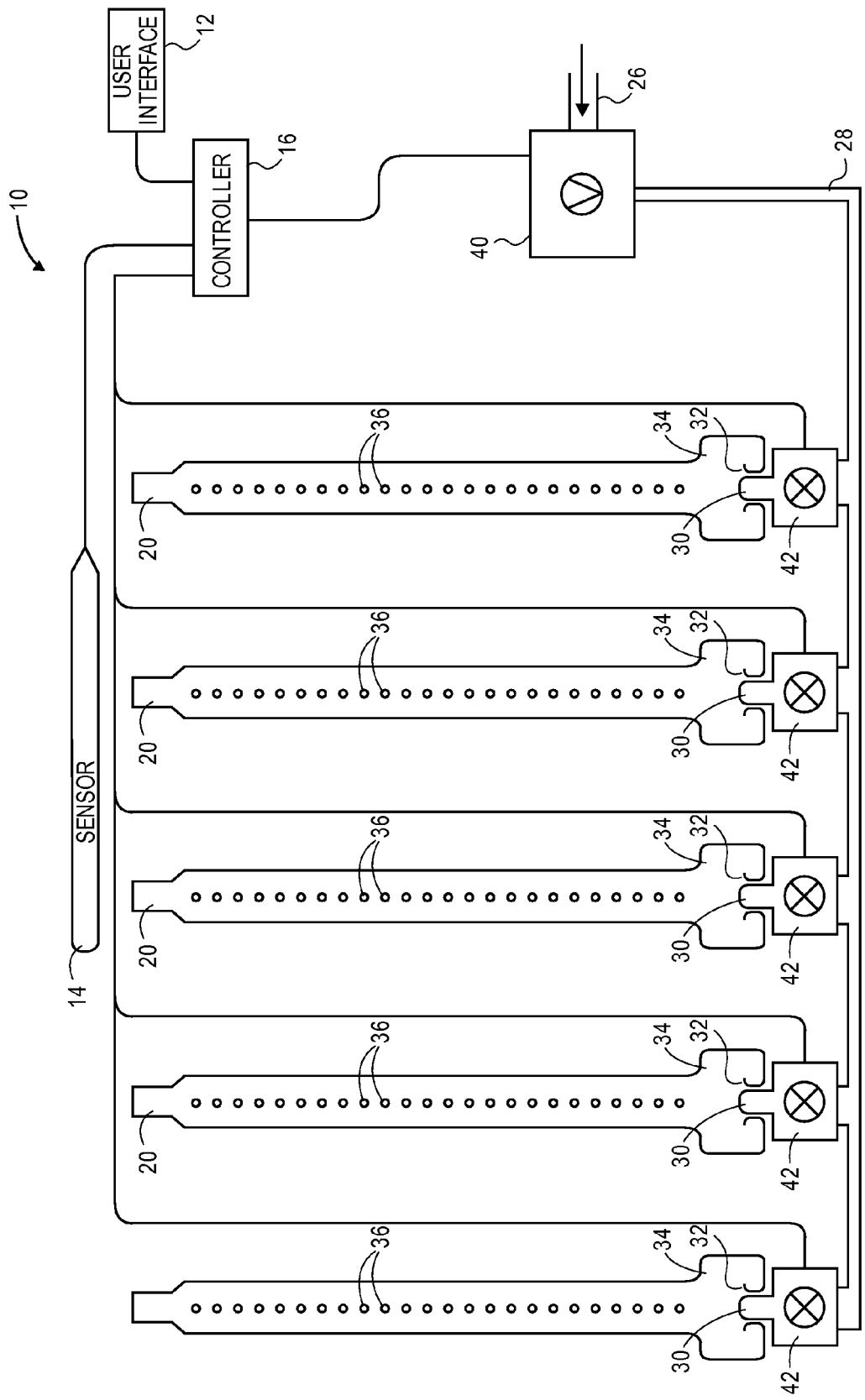
FIG. 2 is a schematic diagram of a second embodiment of the variable output heating control system.

Another exemplary embodiment of the variable output heating control system 10 is shown in FIG. 2. The system 10 comprises a user interface 12, an operating parameter sensor 14, a controller 16, and a heat generating unit 18 that includes a plurality of burners 20, a modulating combination control valve 40, and a plurality of shutoff valves 42.

The user interface 12, the operating parameter sensor 14, the controller 16, and the burners 20 are substantially similar to the same-named components described above. Additionally, the controller 16 may communicate with the modulating combination control valve 40 in the same manner as the controller 16 may communicate with the combination control valve 22 described above. Furthermore, the controller 16 may communicate with the shutoff valves 42 in the same manner as the controller 16 may communicate with the variable orifice modulating valves described above.

The modulating combination control valve 40 generally controls the flow of gas from an external fuel supply through the gas inlet 26 to the shutoff valves 42. Typically, the gas coming through the gas inlet 26 is at a relatively high pressure. The modulating combination control valve 40 may reduce the pressure of the incoming gas, thereby reducing the flow of gas to the shutoff valves 42. Typically, the modulating combination control valve 40 includes all the components of the combination control valve with additional components or structure that may vary, meter, or modulate the pressure of the gas, and in turn the flow of gas, that is supplied to the shutoff valves 42. Furthermore, the modulating combination control valve 40 may cut off the flow of gas to the shutoff valves 42.

The controller 16 may send a signal to the modulating combination control valve 40 to set the pressure of the gas supplied to the shutoff valves 42, wherein the pressure may vary from a level that is below the external supply line pressure down to a level that is above a cutoff point. The controller 16 may also send a signal to the modulating combination control valve 40 to close and shut off the flow of gas.

The modulating combination control valve 40 and the shutoff valves 42 may be generally in close proximity to each other. The modulating combination control valve 40 may be connected to the shutoff valves 42 through a manifold 28. Other connection schemes include piping, tubing, ducting, or the like, in addition to fittings, connectors, and couplers.

The shutoff valve 42 generally acts as a gate for the flow of gas from the modulating combination control valve 40 to the burner 20 to which the shutoff valve 42 is coupled. The shutoff valve 42 may be open to allow gas to flow to the burner 20 with little loss of pressure or the shutoff valve 42 may be closed to prevent the flow of gas into the burner. The shutoff valve 42 may receive a signal from the controller 16 to open and allow gas flow to the burner 20 or to close and prevent gas flow to the burner. The shutoff valve 42 may include any component or combination of components that is operable to shut off the flow of gas between an input and an output.

The shutoff valve 42 may include an output orifice 30 that is similar to the output orifice 30 of the variable flow valve 24 and may couple to the burner 20 in the same manner as the variable flow valve, described above.

The operation of the second embodiment of the variable output heating control system 10 may be as follows. The second embodiment of the system 10 may include five burners 20 receiving gas flow from five shutoff valves 42, as seen in FIG. 2. In a similar fashion to the first embodiment, discussed above, a user enters the set temperature to the controller 16 by using the user interface 12. The controller 16 compares the set temperature with the measured temperature. If the measured temperature is above the set temperature, the controller 16 may send a signal to the modulating combination control valve 40 to partially close to reduce the flow of gas to near the shutoff point. Or, the controller 16 may close the modulating combination control valve 40, thereby shutting off the flow of gas to the shutoff valves 42. The controller 16 may also send a signal to one or more the shutoff valves 42 to stop the flow of gas to each individual burner.

If the measured temperature is below the set temperature, the controller 16 may send a signal to open at least one of the shutoff valves 42 and to at least partially open the modulating combination control valve 40. If the measured temperature is well below the set temperature, the controller 16 may leave the shutoff valves 42 open and send a signal to the modulating combination control valve 40 to allow 100% gas flow to the shutoff valves 42, increasing the level of the flames 38 and the heat produced. As the measured temperature approaches the set temperature, the controller 16 may send a signal to the modulating combination control valve 40 to reduce the gas flow rate. For example, the controller 16 may send a signal to the modulating combination control valve 40 to reduce the flow of gas to 50%, thereby reducing the heat output by approximately 50%.

Alternatively, the controller 16 may send a signal to one or more of the shutoff valves 42 to close, without reducing the flow of gas from the modulating combination control valve 40. For example, the controller 16 may close two of the five shutoff valves 42, thereby decreasing heat output to approximately 60% of full capacity. Furthermore, the controller 16 may send a signal to one or more of the shutoff valves 42 to close, in addition to sending a signal to the modulating combination control valve 40 to reduce the flow of gas. For example, the controller 16 may close two of the five shutoff valves 42 and reduce the gas flow rate to 50%, thus leaving three burners 20 on, each receiving 50% gas flow rate, thereby reducing heat output to approximately 30% of full value. As with the first embodiment discussed above, how many shutoff valves 42 are closed and how the flow rate is reduced may depend on a plurality of factors such as the rate at which the measured temperature is approaching the set temperature as well as the controller architecture type and factors that include optimization, such as reduced temperature overshoot, decreased settling time, etc.

As the measured temperature gets very close to the set temperature, the controller 16 may continue to reduce the flow rate of the modulating combination control valve 40, in addition to closing shutoff valves 42 as necessary. If the measured temperature equals the set temperature, the controller 16 may reduce the flow rate of the modulating combination control valve 40 to its minimum or near the minimum, in addition to closing shutoff valves 42. Although, as long as the modulating combination control valve 40 is allowing gas to flow, even at a minimum rate, at least one shutoff valve 42 is open to allow the gas to flow to at least one burner. With the combination of reducing gas flow and shutting off burners 20, the controller 16 can adjust the heat output of the system 10 with fine resolution. The controller 16 may maintain this setting, or may adjust the setting slightly, as long as the two temperatures are equal. If the measured temperature increases or decreases, the controller 16 may adjust the flow rate of the modulating combination control valve 40 or open or close the shutoff valves 42 accordingly, as described above.

Figure 3:
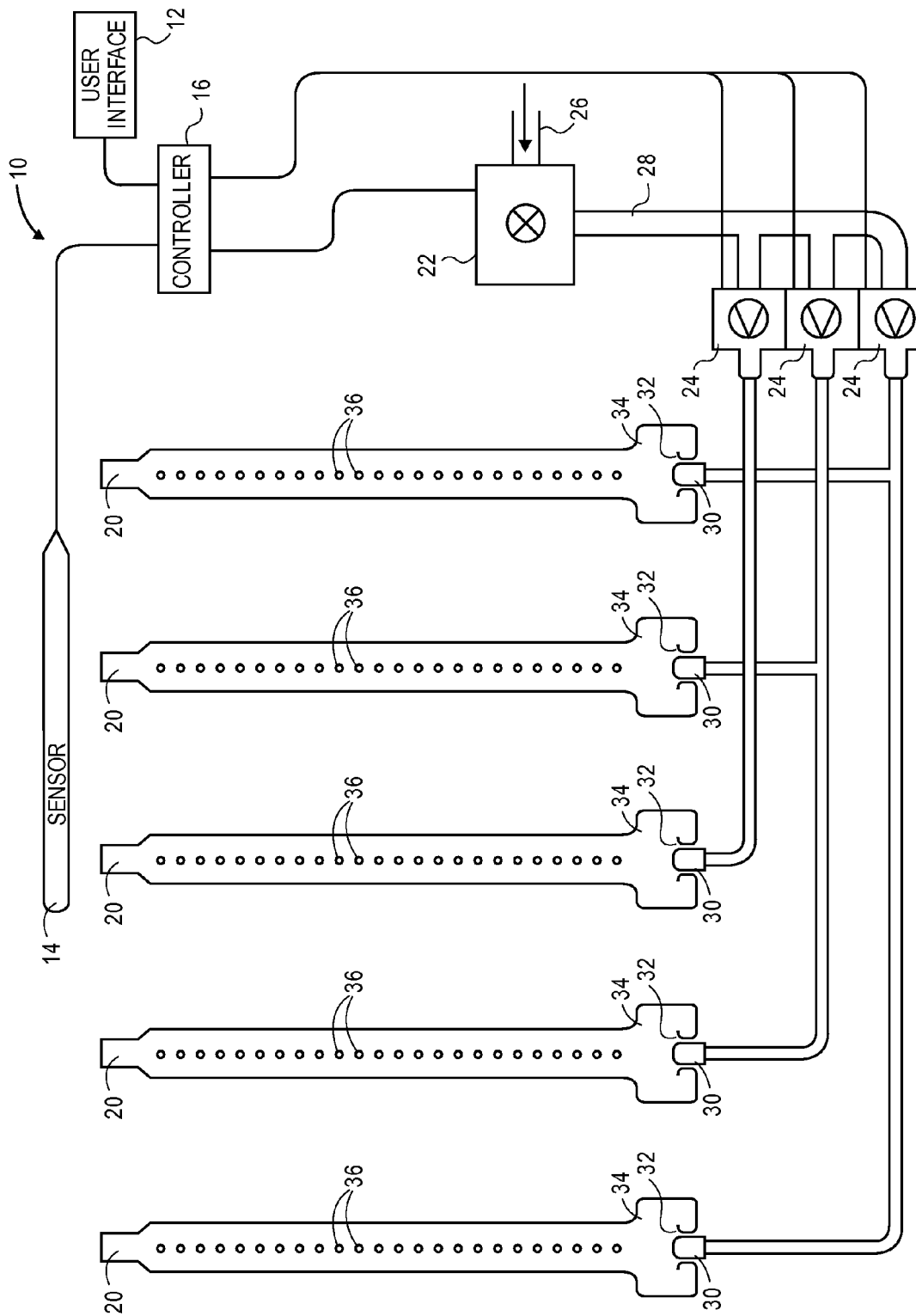
FIG. 3 is a schematic diagram of a third embodiment of the variable output heating control system.

Another exemplary embodiment of the variable output heating control system 10 is shown in FIG. 3. The third embodiment may comprise a user interface 12, an operating parameter sensor 14, a controller 16, a plurality of burners 20, a combination control valve 22, and a plurality of variable flow valves 24. The third embodiment of the system 10 is substantially similar to the system 10 of the first embodiment except each variable flow valve 24 may be coupled to one or more burners 20, as depicted. The output orifice 30 of each variable flow valve 24 may be coupled to tubing which connects to the inlet port 32 of one or more burners 20. This embodiment allows for good control of the heat output while offering reduced cost of manufacture by reducing the number of variable flow valves 24 needed for a given number of burners 20.

Figure 4:
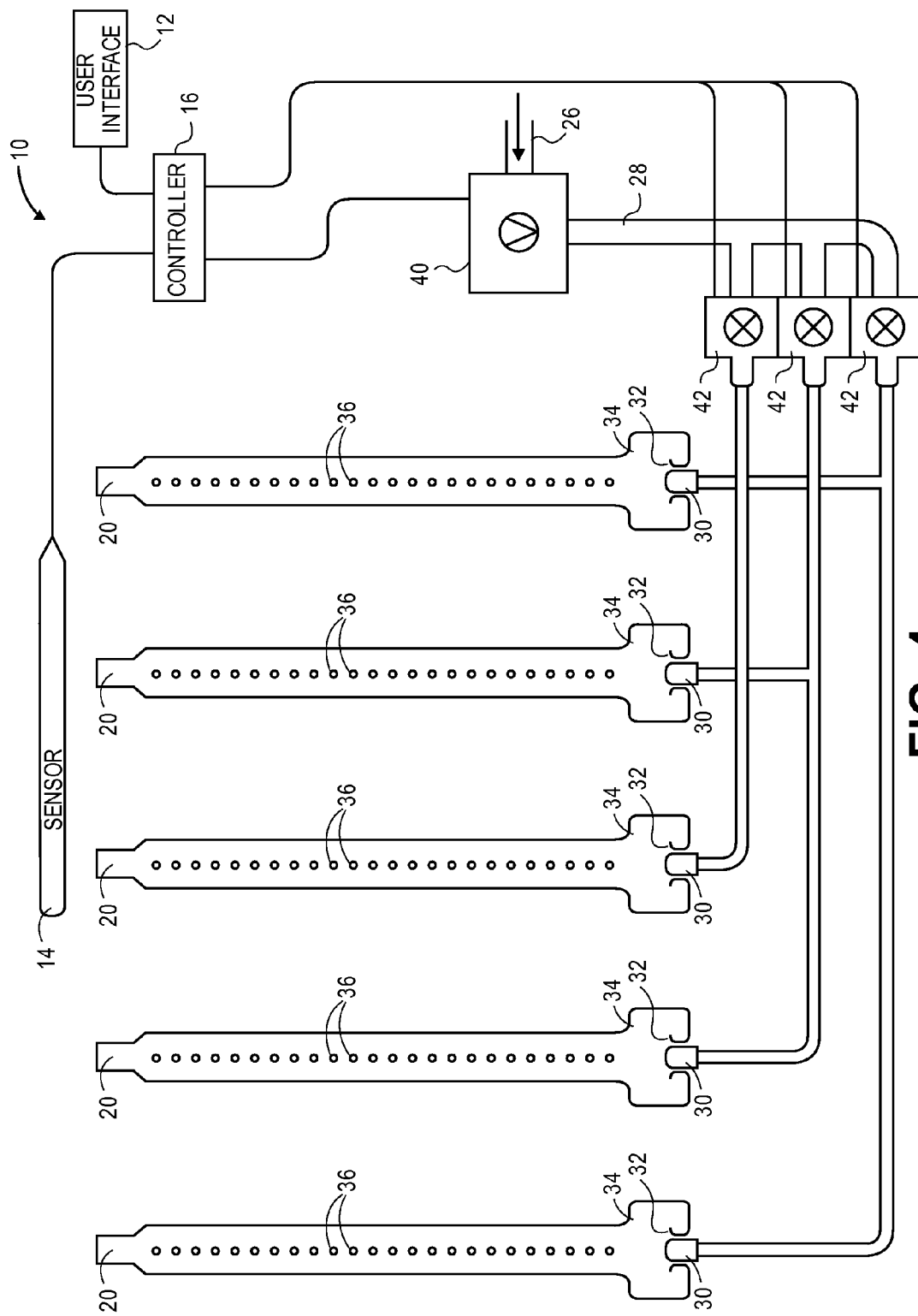
FIG. 4 is a schematic diagram of a fourth embodiment of the variable output heating control system.

Another exemplary embodiment of the variable output heating control system 10 is shown in FIG. 4. The system 10 of the fourth embodiment may comprise a user interface 12, an operating parameter sensor 14, a controller 16, a plurality of burners 20, a modulating combination control valve 40, and a plurality of shutoff valves 42. The fourth embodiment of the system 10 is substantially similar to the system 10 of the second embodiment except each shutoff valve 42 may be coupled to one or more burners 20, as depicted. The output orifice 30 of each shutoff valve 42 may be coupled to tubing which connects to the inlet port 32 of one or more burners 20. This embodiment allows for good control of the heat output while offering reduced cost of manufacture by reducing the number of shutoff valves 42 needed for a given number of burners 20.

Figure 5:
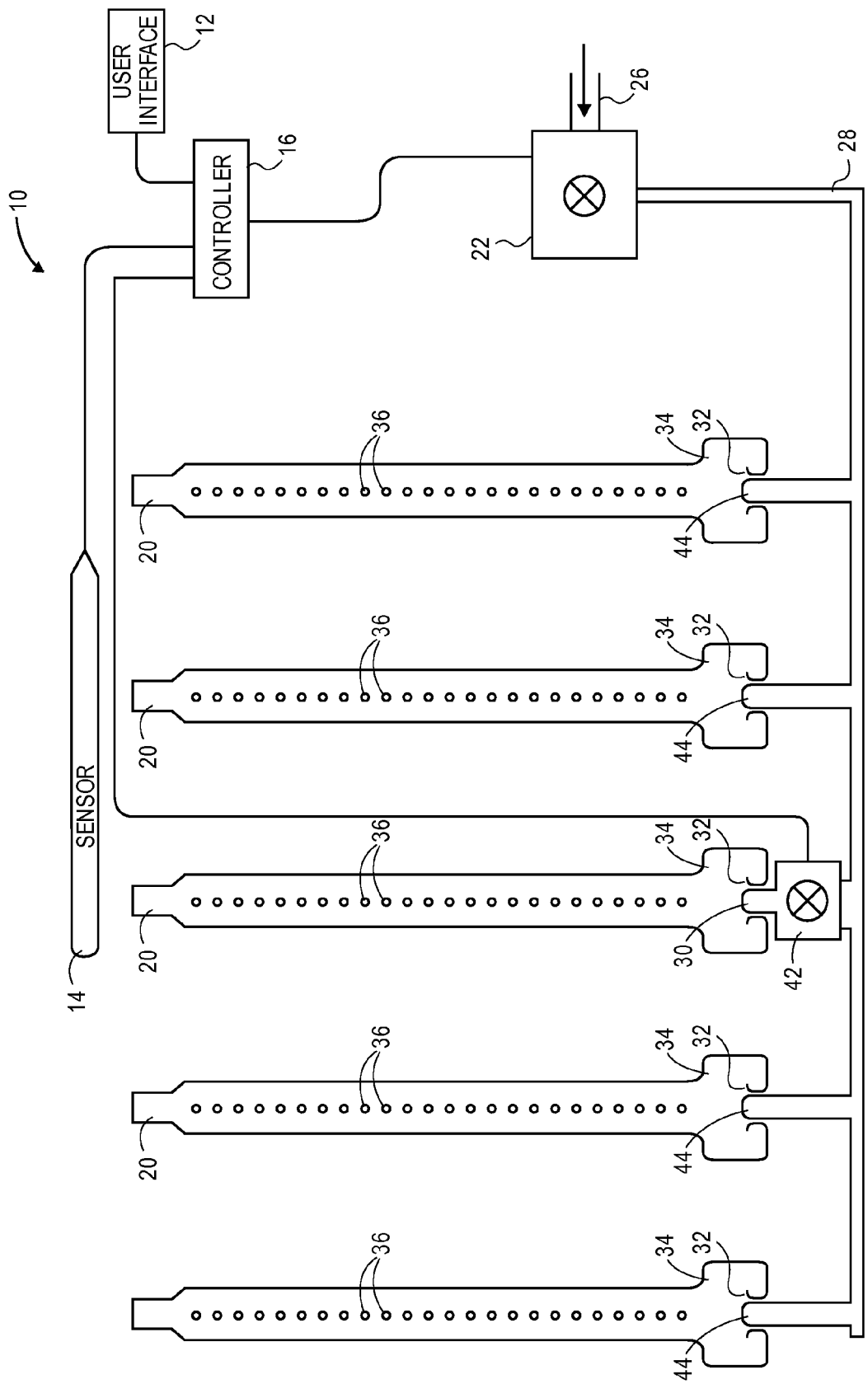
FIG. 5 is a schematic diagram of a fifth embodiment of the variable output heating control system.

Another exemplary embodiment of the variable output heating control system 10 is shown in FIG. 5. The system 10 of the fifth embodiment may comprise a user interface 12, an operating parameter sensor 14, a controller 16, a plurality of burners 20, a combination control valve 22, and a shutoff valve 42. These components operate in a substantially similar fashion as described above. The combination control valve 22 controls the flow of gas to a plurality of burners 20 through a standard orifice 44. Thus, the combination control valve 22 may shut off the flow of gas to the burners 20. The shutoff valve 42 may be coupled to at least one of the burners 20, as depicted in FIG. 5, allowing the ability to shut off the flow of gas to only those burners 20 coupled to a shutoff valve 42. This embodiment of the system 10 can provide temperature control by shutting off one or more selected burners without adding modulation controls, which may be more expensive.

The variable output heating control system 10 of the fifth embodiment may operate as follows. The system 10 may include one or more burners 20, the combination control valve 22, and at least one shutoff valve 42. An exemplary embodiment of the system 10, as seen in FIG. 5, includes four burners 20 receiving gas from the combination control valve 22 and one burner 20 receiving gas through the shutoff valve 42. A user enters a temperature, the set temperature, to the controller 16 by using the user interface 12. The controller 16 compares the set temperature with the measured temperature, supplied by the operating parameter sensor 14. If the measured temperature is above the set temperature, the controller 16 may close the combination control valve 22, thereby shutting off the flow of gas to the shutoff valve 42, and the burners 20.

If the measured temperature is below the set temperature, the controller 16 may send a signal to the combination control valve 22 to open to allow some gas to flow to the burners 20, where it may be combusted and produce heat. If the measured temperature is well below the set temperature, the controller 16 may leave the combination control valve 22 open and send a signal to the shutoff valve 42 to open and allow gas flow to its connected burner 20. As the measured temperature approaches the set temperature, the controller 16 may send a signal to the shutoff valve 42 to close again.

If the measured temperature equals the set temperature, the controller 16 may send a signal to the combination control valve 22 to open periodically. The controller 16 may maintain this setting, or may adjust the setting slightly, as long as the two temperatures are equal. If the measured temperature increases or decreases, the controller 16 may open or close the combination control valve 22 and the shutoff valve 42 accordingly, as described above.

The variable output heating control system 10 is disclosed primarily for use with a residential or commercial gas furnace. However, the principles of the invention disclosed herein may also be used with a water heater, a boiler, a hot water tank, an oil furnace, a gas fireplace, a residential gas oven, a commercial gas oven, a gas grill, a gas clothes dryer, a gas agricultural grain dryer, a materials processor, a materials dryer, a process dryer, a thermal processor, a fluids processor, a chemicals processor, or other systems or devices requiring a controlled, variable output heat source.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A heating control system, the system comprising:
   a single electronic controller operable to receive a set temperature and a measured temperature and to generate a plurality of gas flow control commands, including to modulate a flow of gas in incremental steps of less than one percent;
   a combination control valve operable to control flow of gas from an external gas source based on a gas flow control command from the controller;
   a plurality of variable flow valves operable to vary flow of gas received from the combination control valve based on a gas flow control command from the controller, wherein each variable flow valve is operably in communication with the controller and may be varied separately based on a gas flow control command from the controller, and each variable flow valve modulates the flow of gas in incremental steps of less than one percent; and
   a plurality of burners to provide heat corresponding to the combustion of gas received from the plurality of variable flow valves.

2. The system of claim 1, wherein the heating control system may be used to control the temperature in a system selected from the group consisting of a gas furnace, a water heater, a boiler, a hot water tank, an oil furnace, a gas fireplace, a residential gas oven, a commercial gas oven, a gas grill, a gas clothes dryer, a gas agricultural grain dryer, a materials processor, a materials dryer, a process dryer, a thermal processor, a fluids processor, and a chemicals processor.

3. The system of claim 1, further including a user interface coupled with the controller for a user to enter operating parameters, including the set temperature.

4. The system of claim 1, further including at least one operating parameter sensor coupled with the controller operable to provide the measured temperature and other operating parameters.

5. The system of claim 1, wherein the plurality of variable flow valves includes a plurality of variable orifice modulating valves, such that each variable orifice modulating valve varies the flow of gas by the movement of a metering pin at an output orifice of the variable orifice modulating valve.

6. The system of claim 1, wherein the controller generates a command to increase the flow of gas if the measured temperature is less than the set temperature.

7. The system of claim 1, wherein the controller generates a command to decrease the flow of gas if the measured temperature is greater than the set temperature.

8. The system of claim 1, wherein at least a portion of the burners receives gas from one variable flow valve.

9. A method for controlling the heat output of a combustible fuel heating system, the method comprising the steps of a controller:
   a) receiving a set temperature from a user;
   b) receiving a first measured temperature from at least one operating parameter sensor;
   c) comparing the first measured temperature and the set temperature;
   d) issuing a command to a combination control valve to shut off flow of gas through a plurality of variable flow valves to a plurality of burners for the first measured temperature above the set temperature;
   e) issuing a command to the combination control valve to open to allow a first rate of flow of gas through the plurality of variable flow valves to the plurality of burners for the first measured temperature below the set temperature;
   f) issuing a command to at least a portion of the plurality of variable flow valves to increase the flow of gas in increments of less than one percent from the first rate of flow to a second rate of flow selected from possible values of less than one percent to one hundred percent to at least a portion of the plurality of burners for the first measured temperature less than the set temperature;
   g) issuing a command to a portion of the plurality of variable flow valves to decrease the flow of gas in increments of less than one percent from the second rate of flow to a third rate of flow that is greater than the first rate of flow selected from possible values of one hundred percent to less than one percent to at least a portion of the plurality of burners for a second measured temperature greater than the first measured temperature and less than the set temperature;
   h) issuing a command to at least a portion of the plurality of variable flow valves to allow a fourth rate of flow of gas to the plurality of burners for a measured temperature that is equal to the set temperature.

10. The method of claim 9, wherein steps b) through h) are repeated multiple times.

11. The method of claim 9, wherein the number of variable flow valves is equal to the number of burners and the variable flow valves are coupled to the burners in a one- to-one fashion.

12. The method of claim 9, wherein the number of variable flow valves is less than the number of burners and each variable flow valve is coupled to at least one burner.

13. The method of claim 9, wherein the variable flow valve is a variable orifice modulating valve.

14. A heating control system, the system comprising:
   a controller operable to receive a set temperature and a measured temperature and to generate a plurality of gas flow control commands;
   a combination control valve operable to control flow of gas from an external gas source based on a gas flow control command from the controller;
   a plurality of variable flow valves operable to vary flow of gas received from the combination control valve based on a gas flow control command from the controller, wherein each variable flow valve may be varied separately, and each variable flow valve includes:
      an orifice hood with a wall defining a recess and an outlet orifice, the recess including a tapered section that narrows from a wide portion to a narrow portion, the outlet orifice extending from the narrow portion of the recess through the wall to an outer surface of the orifice hood, and a metering pin including:
- a central portion extending along a length of the metering pin, and
- a plurality of fins, each fin extending radially outwardly from the central portion and extending, only along a portion of a length of the metering pin, the fins and central portion being tapered at an end of the metering pin such that the tapered portion of the metering pin conforms to the tapered section of the recess, the metering pin including a passage for allowing gas to pass through the metering pin to the outlet orifice, the fins being spaced apart along a circumference of the metering pin with an elongated four-sided opening between each pair of fins allowing, gas to flow from the recess to the passage, each opening extending approximately half the length of the fins; and a plurality of burners to provide heat corresponding to the combustion of gas received from the plurality of variable flow valves.

15. A heating control system, the system comprising:

a single electronic controller operable to receive a set temperature and a measured temperature and to generate a plurality of gas flow control commands, including to modulate a flow of gas in incremental steps of less than one percent;

a combination control valve operable to control flow of gas from an external gas source based on a gas flow control command from the controller;

a plurality of variable flow valves operable to vary flow of gas received from the combination control valve based on a gas flow control command from the controller, wherein each variable flow valve is operably in communication with the controller and may be varied separately based on a gas flow control command from the controller, and each variable flow valve modulates the flow of gas in incremental steps of less than at most one percent over the range from less than one percent to one hundred percent; and a plurality of burners to provide heat corresponding to the combustion of gas received from the plurality of variable flow valves.

* * * * *